(12) United States Patent
Yura et al.

(10) Patent No.: US 9,246,168 B2
(45) Date of Patent: Jan. 26, 2016

(54) POSITIVE ELECTRODE ACTIVE MATERIAL FOR LITHIUM SECONDARY BATTERY

(71) Applicant: NGK INSULATORS, LTD., Nagoya-Shi (JP)

(72) Inventors: Yukinobu Yura, Nagoya (JP); Kei Sato, Nagoya (JP); Nobuyuki Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 14/546,247

(22) Filed: Nov. 18, 2014

(65) Prior Publication Data

US 2015/0086787 A1 Mar. 26, 2015

Related U.S. Application Data

(63) Continuation of application No. PCT/JP2013/072530, filed on Aug. 23, 2013.

(60) Provisional application No. 61/753,088, filed on Jan. 16, 2013.

(30) Foreign Application Priority Data

Sep. 4, 2012 (JP) .................................. 2012-193967
Apr. 25, 2013 (JP) .................................. 2013-092798

(51) Int. Cl.
*H01M 4/485* (2010.01)
*H01M 4/36* (2006.01)
(Continued)

(52) U.S. Cl.
CPC .............. *H01M 4/485* (2013.01); *H01M 4/131* (2013.01); *H01M 4/366* (2013.01); *H01M 4/505* (2013.01);
(Continued)

(58) Field of Classification Search
None
See application file for complete search history.

(56) References Cited

U.S. PATENT DOCUMENTS 5,631,100 A 5/1997 Yoshino et al.
2005/0123832 A1 6/2005 Tsukuma et al.
(Continued)

FOREIGN PATENT DOCUMENTS

JP 05-226004 A 9/1993
JP 2002-75365 A 3/2002
(Continued)

OTHER PUBLICATIONS

International Search Report and Written Opinion (With English Translation), International Application No. PCT/JP2013/072530, dated Sep. 24, 2013 (12 pages).
(Continued)

*Primary Examiner* — Ronak Patel
(74) *Attorney, Agent, or Firm* — Burr & Brown, PLLC

(57) ABSTRACT

The present invention provides a positive electrode active material for lithium secondary batteries, comprising domain-oriented agglomerated particles, wherein each of the domain-oriented agglomerated particles comprises a plurality of individually oriented secondary particles such that adjacent secondary particles thereof have mutually different orientation directions, and wherein each of the individually oriented secondary particles is composed of a plurality of primary particles which are composed of a lithium complex oxide with a layered rock-salt structure and are oriented such that the (003) planes of the primary particles do not intersect each other at least in one axial direction. According to the present invention, a positive electrode active material can be provided that is capable of achieving not only high initial output performance but also a high output performance retention rate when charging and discharging are performed repeatedly.

9 Claims, 2 Drawing Sheets

(51) Int. Cl.
*H01M 4/131* (2010.01)
*H01M 4/505* (2010.01)
*H01M 4/525* (2010.01)
*H01M 10/052* (2010.01)
*H01M 4/02* (2006.01)
*H01M 10/0525* (2010.01)

(52) U.S. Cl.
CPC ............ *H01M 4/525* (2013.01); *H01M 10/052* (2013.01); *H01M 10/0525* (2013.01); *H01M 2004/021* (2013.01); *Y02E 60/122* (2013.01)

(56) References Cited

U.S. PATENT DOCUMENTS

| | | | |
|---|---|---|---|
| 2007/0212602 A1* | 9/2007 | Yuasa et al. | 429/128 |
| 2007/0248883 A1* | 10/2007 | Oda et al. | 429/231.1 |
| 2009/0104517 A1* | 4/2009 | Yuasa et al. | 429/158 |
| 2010/0159325 A1 | 6/2010 | Sugiura et al. | |
| 2012/0256337 A1 | 10/2012 | Yokoyama et al. | |
| 2012/0258369 A1* | 10/2012 | Yokoyama et al. | 429/231.1 |

FOREIGN PATENT DOCUMENTS

| | | |
|---|---|---|
| JP | 2003-132887 A | 5/2003 |
| JP | 2004-083388 A | 3/2004 |
| JP | 2009-117241 A | 5/2009 |
| JP | 2009-295514 A | 12/2009 |
| WO | 2010/074304 A1 | 7/2010 |
| WO | 2012/137391 A1 | 10/2012 |

OTHER PUBLICATIONS

Written Opinion (With English Translation), International Application No. PCT/JP2013/072530, dated Sep. 24, 2013 (4 pages).

* cited by examiner

POSITIVE ELECTRODE ACTIVE MATERIAL FOR LITHIUM SECONDARY BATTERY

BACKGROUND OF THE INVENTION

1. Field of the Invention

The present invention relates to a positive electrode active material having a layered rock-salt structure for lithium secondary batteries.

2. Description of the Related Art

Positive electrode active materials using a lithium complex oxide (lithium transition metal oxide) having a layered rock-salt structure are widely known as positive electrode active materials in lithium secondary batteries (which may be referred to as lithium ion secondary batteries) (see, for example, Patent Document 1 (JP5-226004A) and Patent Document 2 (JP2003-132887A)).

It is known that, in positive electrode active materials of this type, diffusion of lithium ions ($Li^+$) therein takes place along an in-plane direction of the (003) plane (i.e., any direction in the plane parallel to the (003) plane) while intercalation and deintercalation of lithium ions occur through a crystal plane other than the (003) plane (e.g., the (101) plane or the (104) plane).

Thus, for positive electrode active materials of this type, attempts have been made to enhance battery performance of lithium secondary batteries by exposing a crystal plane through which lithium ions are favorably intercalated and deintercalated (i.e., a plane other than the (003) plane, such as the (101) plane or the (104) plane) to a surface which comes into contact with a larger amount of electrolyte (see, for example, Patent Document 3 (WO2010/074304)).

In addition, in positive electrode active materials of this type, those having pores (also referred to as holes or voids) formed therein are known (see, for example, Patent Document 4 (JP2002-75365A), Patent Document 5 (JP2004-083388A), and Patent Document 6 (JP2009-117241A)). Furthermore, a positive electrode active material having voids inside, in which primary particles are oriented in the one axial direction in secondary particles, is also known, and this configuration makes it possible to obtain high output performance and rate performance (see, for example, Patent Document 7 (WO2012/137391).

CITATION LIST

Patent Documents

Patent Document 1: JP5-226004A
Patent Document 2: JP2003-132887A
Patent Document 3: WO2010/074304
Patent Document 4: JP2002-75365A
Patent Document 5: JP2004-083388A
Patent Document 6: JP2009-117241A
Patent Document 7: WO2012/137391

SUMMARY OF THE INVENTION

The inventors have currently found that by configuring a positive electrode active material in the form of a domain-oriented agglomerated particle in which a plurality of individually oriented secondary particles are randomly agglomerated, it is possible to provide a positive electrode active material capable of achieving not only high initial output performance but also a high output performance retention rate when charging and discharging are performed repeatedly.

Accordingly, an object of the present invention is to provide a positive electrode active material capable of achieving not only high initial output performance but also a high output performance retention rate when charging and discharging are performed repeatedly.

According to an aspect of the present invention, there is provided a positive electrode active material for lithium secondary batteries, comprising domain-oriented agglomerated particles,
wherein each of the domain-oriented agglomerated particles comprises a plurality of individually oriented secondary particles such that adjacent secondary particles thereof have mutually different orientation directions, and
wherein each of the individually oriented secondary particles is composed of a plurality of primary particles which are composed of a lithium complex oxide with a layered rock-salt structure and are oriented such that the (003) planes of the primary particles do not intersect each other at least in one axial direction.

DETAILED DESCRIPTION OF THE INVENTION

Definitions

Figure 1:
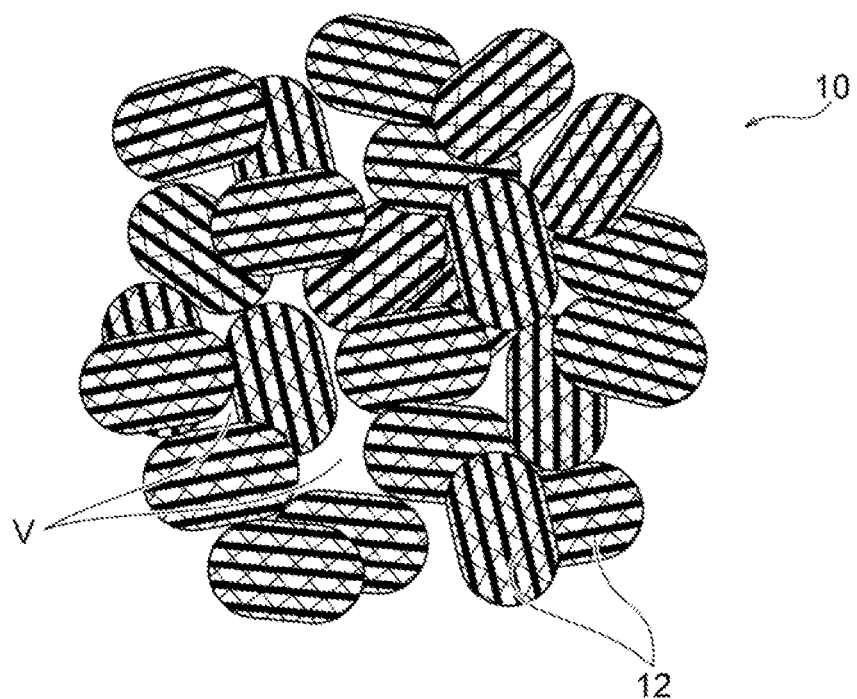
FIG. 1 is a schematic diagram showing a domain-oriented agglomerated particle in the positive electrode active material of the present invention.

Definitions of some terms used herein will now be provided below.

The "primary particle" refers to a unit particle that does not include grain boundaries therein. In contrast, an agglomerate of primary particles or an aggregate of a plurality of (numerous) single-crystal primary particles is referred to as a "secondary particle". In the present invention, there are two forms of secondary particles, i.e., "individually oriented secondary particles" in which a plurality of primary particles are oriented and "domain-oriented agglomerated particles" in which such individually oriented secondary particles are randomly agglomerated, and it should be understood that the "secondary particles" herein encompass both the aforementioned two forms of secondary particles unless specified otherwise. The "average particle diameter" is the average value of the diameters of particles. Such a "diameter" is typically the diameter of a sphere having the same volume or the same cross-sectional area as that of a particle, assuming that the particle has a spherical shape. The "average value" is suitably the value calculated based on the number. The average particle diameter of primary particles can be determined, for example, by observing the surface or cross-section of secondary particles with a scanning electron microscope (SEM). The average particle diameter of secondary particles is evaluated by a volume-based average particle diameter D50 (median diameter) measured with a laser diffraction/scattering type particle size distribution analyzer (e.g., model number "MT3000-II" manufactured by NIKKISO CO., LTD.) using water as a dispersion medium.

The "orientation ratio of (003) planes" refers to the proportion expressed in percent of the oriented (003) planes in secondary particles. That is, the orientation ratio of (003) planes in secondary particles being 60% means that 60 percent of numerous (003) planes ((003) planes in a layered rock-salt structure) included in the secondary particles are parallel to each other. Therefore, it is possible to say that the larger the value is, the higher the degree of orientation of (003) planes in secondary particles is (specifically, numerous single-crystal primary particles constituting the secondary particles are provided such that their respective (003) planes are parallel to each other as much as possible). On the other hand, it is possible to say that the smaller the value is, the lower the degree of orientation of (003) planes in secondary particles is (specifically, numerous single-crystal primary particles constituting the secondary particles are provided such that their respective (003) planes face "various" directions). As described above, secondary particles contain numerous primary particles. Since primary particles are single-crystals, the orientation ratio thereof is not an issue. Thus, from the view point of understanding the state of orientation of numerous primary particles in secondary particles as the state of orientation of the (003) planes of the secondary particles as a whole, the orientation ratio of (003) planes in secondary particles can be paraphrased as "the orientation ratio of (003) planes of primary particles in secondary particles". The orientation ratio of (003) planes can be determined by, for example, in regard to the plate surface or cross-section (processed by a cross-section polisher, a focused ion beam, or the like) of secondary particles, identifying the direction of the (003) plane in each primary particle in the secondary particles using electron back scattering diffraction (EBSD), a transmission electron microscope (TEM), or the like, and calculating the proportion of the number of primary particles the directions of which are aligned (within ±10 degrees) to the total number of primary particles.

The "aspect ratio" is the ratio between the diameter in the longitudinal direction (major axis diameter) and the diameter in the short direction (minor axis diameter) of a particle. It is possible to say that the closer the value is to 1, the more spherical the particle shape is. The "voidage" is the volume ratio of voids (pores, including open pores and closed pores) in the positive electrode active material of the present invention. The "voidage" may be referred to as "porosity". This "voidage" is determined by, for example, calculation from bulk density and true density. The "average pore diameter" is the average value of the diameters of pores in secondary particles. This "diameter" is typically the diameter of a sphere having the same volume or the same cross-sectional area as that of a pore, assuming that the pore has a spherical shape. The "average value" is suitably the value calculated based on the number. The average pore diameter can be determined by a well-known technique such as image processing on an SEM micrograph of the cross-section of secondary particles, or a mercury intrusion technique. The "open pore ratio" is the ratio of open pores that are in communication with outside air to all pores in secondary particles.

Positive Electrode Active Material for Lithium Secondary Batteries

The positive electrode active material for lithium secondary batteries of the present invention comprises domain-oriented agglomerated particles, each of which comprises a plurality of individually oriented secondary particles such that adjacent secondary particles thereof have mutually different orientation directions. Each of the individually oriented secondary particles is composed of a plurality of primary particles, which are composed of a lithium complex oxide with a layered rock-salt structure and are oriented such that the (003) planes of the primary particles do not intersect each other at least in one axial direction. The "layered rock-salt structure" refers to a crystal structure in which a lithium layer and a layer of a transition metal other than lithium are alternately stacked, with an oxygen layer being interposed therebetween (typically the $\alpha$-NaFeO$_2$ type structure: a structure in which a transition metal and lithium are orderly arranged along the [111]-axis direction of a cubic rock-salt type structure). A lithium secondary battery including a positive electrode active material with such a configuration makes it possible to achieve not only high initial output performance but also a high output performance retention rate when charging and discharging are performed repeatedly. A theoretical reason therefor is rationally presumed as follows.

Figure 2:
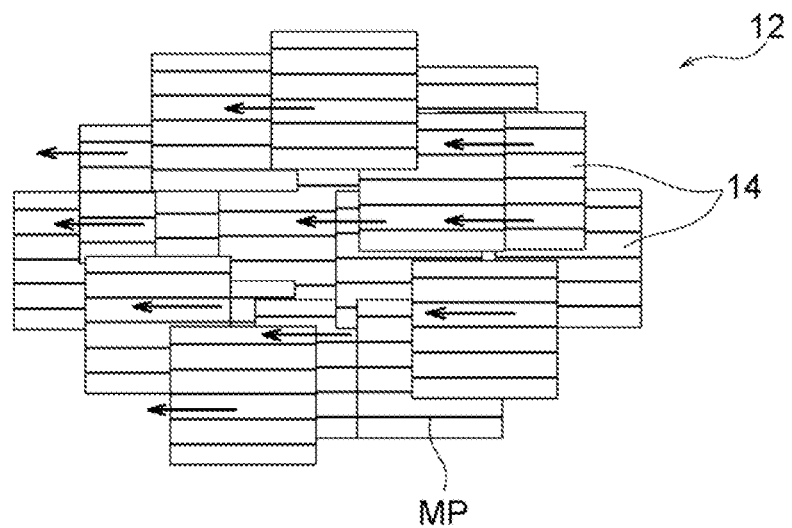
FIG. 2 is a schematic diagram showing one form of an individually oriented secondary particle in the positive electrode active material of the present invention.

Specifically, as schematically shown in FIG. 1, a domain-oriented agglomerated particle 10 comprises a plurality of individually oriented secondary particles 12 such that adjacent secondary particles 12 thereof have mutually different orientation directions. That is, the plurality of individually oriented secondary particles 12 randomly agglomerate to constitute the domain-oriented agglomerated particle 10. Each individually oriented secondary particle 12 is, as schematically shown in FIG. 2, composed of a plurality of primary particles 14 oriented such that the (003) planes do not intersect each other at least in the one axial direction. In the positive electrode active material having this configuration, the directions of electron conduction and lithium ion diffusion (particularly, the direction of electron conduction) of adjacent primary particles are favorably aligned. Therefore, electron conduction paths and lithium ion diffusion paths (particularly, electron conduction paths) in the individually oriented secondary particles are favorably ensured, thus making it possible to enhance battery performance. In particular, it is possible to enhance the discharge voltage at a high rate (hereinafter simply referred to as "output performance") and the discharge capacity at a high rate (hereinafter referred simply to as "rate performance").

In particular, a plurality of individually oriented secondary particles 12 are randomly agglomerated in the domain-oriented agglomerated particles 10 of the present invention, and it is therefore possible to achieve a high output performance retention rate when charging and discharging are performed repeatedly. This is considered to be because, when charging and discharging are performed repeatedly, each individually oriented secondary particle 12 develops anisotropy in expansion and contraction associated with intercalation and deintercalation of lithium ions due to the aforementioned orientation, and random agglomeration of the individually oriented secondary particles 12 cancels the anisotropy of expansion and contraction of individual individually oriented secondary particles 12 to reduce the expansion and contraction as a whole. In this regard, it is considered that in the case of a uniaxially orientated agglomerated particle that is agglomerated such that a plurality of individually oriented secondary particles 12 are aligned in the one axial direction, the anisotropy thereof is amplified, resulting in increased expansion and contraction, and therefore it can be said that the domain-oriented agglomerated particles 10 of the present invention are improved in this regard. Accordingly, it is possible, even when charging and discharging are repeated, to maintain a favorable contact between the positive electrode active material and a conductive additive and thus to maintain the output performance and the rate performance at a high level. It is considered that, as a result, the positive electrode active material of the present invention, when configured for a lithium secondary battery, can exhibit not only high initial output performance the individually oriented secondary particles potentially have, but also a high output performance retention rate when charging and discharging are performed repeatedly.

Figure 3:
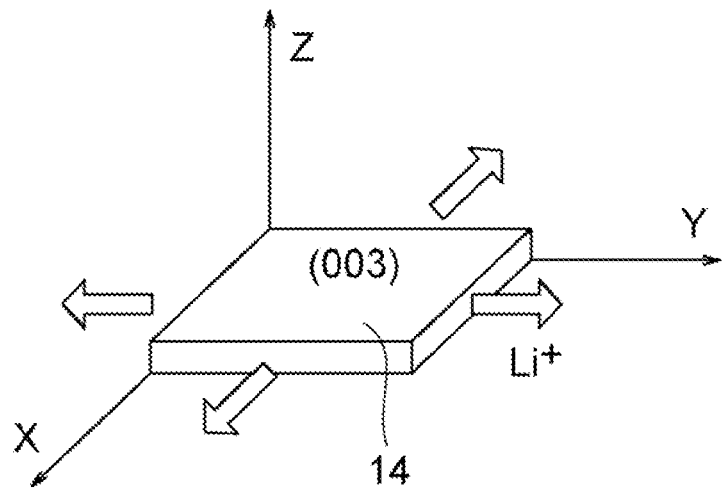
FIG. 3 is a schematic diagram for explaining that lithium ions move along the in-plane direction of the (003) plane in a primary particle.
Figure 4:
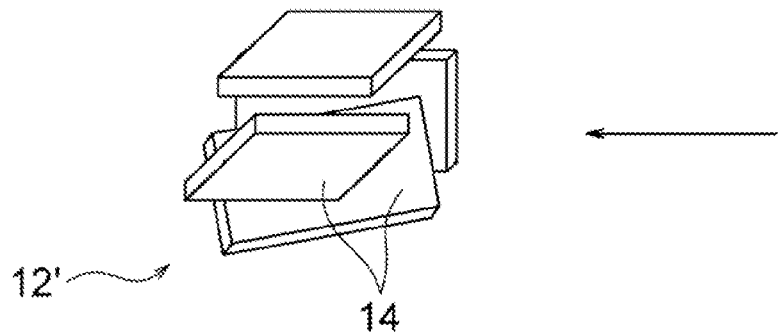
FIG. 4 is a perspective diagram schematically showing an example of the form of orientation of individually oriented secondary particles.
Figure 5:
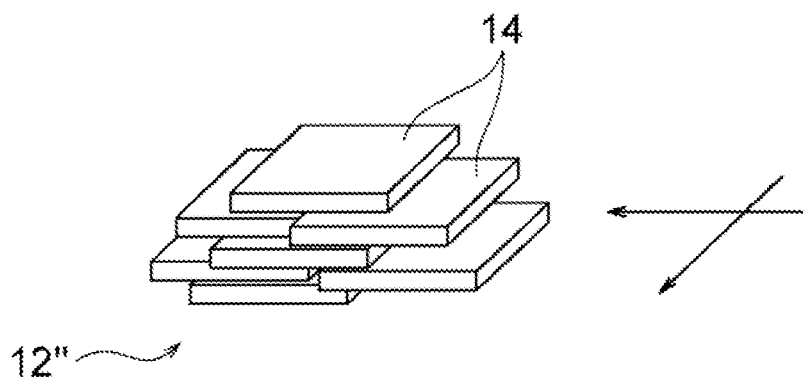
FIG. 5 is a perspective diagram schematically showing another example of the form of orientation of individually oriented secondary particles.

As shown in FIG. 2, the individually oriented secondary particles 12 are secondary particles in which a plurality of primary particles 14 of lithium complex oxide having a layered rock-salt structure are agglomerated. In the individually oriented secondary particles 12, the plurality of primary particles 14 are oriented such that the (003) planes thereof do not intersect each other at least in the one axial direction. That is, as schematically shown in FIG. 3 using the xyz coordinate system, in each primary particle 14, lithium ions move along in-plane directions (e.g., x and y directions in the figure) of the (003) plane perpendicular to the z axis due to the layered rock-salt structure. Therefore, in the form of a secondary particle containing the plurality of primary particles 14, as long as the (003) planes thereof are oriented so as not to intersect each other at least in the one axial direction, lithium ions can move in the direction of this axis without being hampered. Accordingly, as shown in FIG. 4, as long as the plurality of primary particles 14 are oriented such that the (003) planes thereof do not intersect each other in the one axial direction indicated by the arrow, the movability of lithium ions is ensured at least in the direction of this axis in each individually oriented secondary particle 12'. Naturally, as shown in FIG. 5, it is more preferable that the plurality of primary particles 14 are oriented such that the (003) planes thereof are approximately parallel to each other (i.e., the (003) planes mostly do not intersect each other in the directions of two axes), and, in this case, the movability of lithium ions along in-plane directions of the mutually parallel (003) planes is secured in each individually oriented secondary particle 12".

In this regard, the primary particles 14 shown in FIG. 2 are single-crystal primary particles and are oriented such that the (003) planes indicated as "MP" in the figure are approximately parallel to each other (i.e., so as to be as close to a parallel state as possible). Needless to say, as shown in FIG. 2, all (003) planes are parallel to each other in the single-crystal primary particles 14. It can be said that the form of orientation of the primary particles 14 shown in FIG. 2 is of the same kind as that shown in FIG. 5, but the plurality of primary particles 14 are mutually more displaced and arranged in a more stacked manner to constitute the individually oriented secondary particle 12. Preferably, the individually oriented secondary particle 12 is formed so as to have an orientation ratio of (003) planes of 60% or greater and more preferably 75% or greater. This means that the proportion of single-crystal primary particles 14 having the same (003) plane orientation to the total number of single-crystal primary particles 14 contained in the individually oriented secondary particle 12 is preferably 60% or greater and more preferably 75% or greater.

The arrows shown in FIG. 2 indicate the way of electron conduction and lithium ion diffusion in the individually oriented secondary particle 12. In the individually oriented secondary particle 12, it is preferable that a plurality of single-crystal primary particles 14 exist (to such an extent that grain boundary resistance does not become excessive) and that the directions of electron conduction and lithium ion diffusion are favorably aligned between adjacent single-crystal primary particles 14. Thereby, electron conduction paths and lithium ion diffusion paths are favorably ensured. Accordingly, resistance of electron conduction and lithium ion diffusion between the single-crystal primary particles 14 are reduced, and lithium ion conductivity and electron conductivity are enhanced. Therefore, the domain-oriented agglomerated particles 10 comprising a plurality of individually oriented secondary particles 12 make it possible to significantly enhance the charge/discharge characteristics (particularly, rate performance and output performance) of a lithium secondary battery. In more detail, as stated above, orienting the (003) planes so as not to intersect each other at least in the one axial direction in the individually oriented secondary particles 12 reduces lithium ion diffusion resistance and electron conduction resistance between adjacent single-crystal primary particles 14 (i.e., at grain boundaries) and thus enhances lithium ion diffusibility and electron conductivity. This makes it possible to significantly enhance the charge/discharge characteristics (particularly, rate performance and output performance) of a lithium secondary battery. That is, as shown in FIG. 2, the (003) planes (see "MP" in the figure) of the single-crystal primary particles 14 constituting the individually oriented secondary particle 12 are oriented as described above, and thus the grain boundary resistance is reduced. Due to this reduced grain boundary resistance and pores V which contains an electrolytic solution and an electrically conductive material, the maximum level of lithium ion diffusibility and electron conductivity are attained. Microcracks that usually develop between the single-crystal primary particles 14 (i.e., at the grain boundaries) due to volume expansion and contraction resulting from repetitive charging and discharging are likely to spread parallel to the (003) plane which is a lithium ion diffusion plane as well as an electron conduction plane (i.e., along a direction in which cracks neither serve as lithium ion diffusion resistance nor influence electron conductivity). Therefore, it is possible to suppress deterioration of charge/discharge characteristics (particularly, rate performance) resulting from repeated charge/discharge cycles.

The domain-oriented agglomerated particles 10 as a whole preferably have an orientation ratio of (003) planes of 20% or less, more preferably 15% or less, and even more preferably 10% or less. That is, the individually oriented secondary particles 12 have, as described above, highly oriented (003) planes, but since the individually oriented secondary particles 12 are randomly agglomerated, the agglomerated particle as a whole has a low orientation ratio. When the ratio is within the above ranges, it can be said that the individually oriented secondary particles 12 are disposed sufficiently randomly, and therefore a high output performance retention rate can be achieved when charging and discharging are performed repeatedly. Although the orientation ratio is thus low at 20% or less as a whole, the positive electrode active material comprising the domain-oriented agglomerated particles 10 can achieve high battery performance. This is because, in each individually oriented secondary particle 12 constituting the domain-oriented agglomerated particles 10, the single-crystal primary particles 14 are sufficiently orientated as described above. As a result, numerous oriented portions that are similar or analogous to the oriented portions shown in FIG. 2 exist in the domain-oriented agglomerated particles 10, thereby achieving high battery performance similar or close to that of entirely oriented agglomerated particles.

It is preferable that the domain-oriented agglomerated particles 10 have an open pore structure. In this case, an electrolytic solution easily permeates secondary particles through open pores, thus enhancing ion conductivity. Moreover, it is preferable that the positive electrode active material particles 10 have a voidage (volume ratio of pores V) of 1% to 30%. A voidage within this range makes it possible to attain an effect of improving charge/discharge characteristics without impairing the capacity. In particular, the method of the present invention is advantageous in that a high open pore ratio can be achieved even at a low voidage (for example, 10% or less). The open pore ratio in the positive electrode active material particles 10 is preferably 50% or greater, more preferably 60% or greater, even more preferably 70% or greater, particularly preferably 80% or greater, and most preferably 90% or greater. In this way, the higher the open pore ratio is, the more preferable it is, and the upper limit is thus not particularly set. With the voidage being within such a range, raising the open pore ratio facilitates permeation of an electrolytic solution into secondary particles through open pores and thus enhances ion conductivity, and, at the same time, portions other than the open pores can ensure a sufficiently large number of binding portions of the primary particles, which serve as electron conducting paths due to numerous densely bonded primary particles, thus making it possible to suppress deterioration of electron conductivity associated with void formation. It is considered that, as a result, electron conductivity and ion conductivity which intrinsically have a trade-off relation can be compatible with each other, resulting in an improved rate performance.

The single-crystal primary particles 14 preferably have an average particle diameter of 0.1 to 5 μm, more preferably 0.1 to 3 μm, and even more preferably 0.1 to 1.5 μm. With the average particle diameter of the single-crystal primary particles 14 being within the above ranges, the crystallinity of the single-crystal primary particles 14 is ensured. In this regard, when the average particle diameter of the single-crystal primary particles 14 is less than 0.1 μm, the crystallinity of the single-crystal primary particles 14 may be deteriorated to lower the output performance and the rate performance of a lithium secondary battery. However, in the positive electrode active material particles 10 of the present embodiment, no significant deterioration of the output performance or the rate performance is observed even when the average particle diameter of the single-crystal primary particles 14 is from 0.1 to 0.01 μm. On the other hand, the individually oriented secondary particles 12 preferably have an average particle diameter of 0.1 to 20 μm, more preferably 0.3 to 15 μm, and even more preferably 0.5 to 10 μm.

The domain-oriented agglomerated particles 10 preferably have an average particle diameter of 1 to 100 μm, more preferably 2 to 70 μm, even more preferably 3 to 50 μm, and particularly preferably 5 to 25 μm. With the average particle diameter of the domain-oriented particles 10 being within these ranges, the packing property of the positive electrode active material in the positive electrode active material particles 10 is ensured (the ratio of packed particles is enhanced). Moreover, it is possible to form a flat electrode surface while maintaining the output performance and the rate performance of a lithium secondary battery. The distribution of the particle diameters of the domain-oriented aggregated particles 10 may be sharp or broad, and may have multiple peaks. For example, when the distribution of the particle diameters of the domain-oriented agglomerated particles 10 is not sharp, it is possible to increase the packing density of the positive electrode active material in the positive electrode active material layer or to strengthen the adhesion between the positive electrode active material layer and the positive electrode current collector. This can further improve the charge/discharge characteristics.

The aspect ratio of the individually oriented secondary particles 12 is preferably 1.0 or more and less than 5.0, and more preferably 1.0 or more and less than 3.0. An aspect ratio within these ranges makes it possible to form adequate spaces between the domain-oriented aggregated particles 10 and between the individually oriented secondary particles 12 to such an extent that can ensure paths through which lithium ions in an electrolytic solution, with which the positive electrode active material layer is impregnated, diffuse in the thickness direction of the positive electrode active material layer, even when the packing density of the positive electrode active material in the positive electrode active material layer is increased. This can further enhance the output performance and the rate performance of a lithium secondary battery. In other words, with the aspect ratio being within these ranges, the positive electrode active material particles are less likely to be packed such that the major axis direction of the particles are aligned in parallel to the plate surface direction of the positive electrode current collector during the formation of the positive electrode active material layer. Therefore, it is possible to prevent the diffusion paths of lithium ions in the electrolytic solution, in which the positive electrode active material layer is immersed, from elongating to the thickness direction of the positive electrode active material layer. This can suppress deterioration of the output performance and the rate performance of the lithium secondary battery. Moreover, the aspect ratio of the domain-oriented agglomerated particles is preferably 1.0 or more and less than 2.0, more preferably 1.0 or more and less than 1.5, and even more preferably 1.0 or more and less than 1.3. An aspect ratio within these ranges facilitates an increase in electrode density, in addition to providing the above-described effect of enhancing the output performance and the rate performance. As a result, an increased amount of voids in the oriented agglomerated particles can be obtained even when the electrode density is the same. The aspect ratio of the single-crystal primary particles 14 as well is preferably 1.0 or more and less than 2.0, and more preferably 1.1 or more and less than 1.5. With the aspect ratio of the single-crystal primary particles 14 being within these ranges, favorable lithium ion conductivity and electron conductivity are ensured.

The domain-oriented agglomerated particles 10 preferably have an average pore diameter (the average value of the diameters of pores V in the positive electrode active material particles 10) of 0.1 to 5 μm, more preferably 0.3 to 4 μm, and even more preferably 0.5 to 3 μm. With the average pore diameter being within these ranges, formation of relatively large pores V is prevented, thus making it possible to ensure a sufficient amount per volume of the positive electrode active material that contributes to charging and discharging. It is also possible to obtain an effect of evenly relieving stress inside by preventing stress concentration from locally occurring in such large pores V. Furthermore, a conductive material and an electrolyte can be easily introduced inside, making it possible to attain a sufficient stress relieving effect due to the pores V. Therefore, effects of improving charge/discharge characteristics while maintaining a high capacity can be expected.

The value obtained by dividing the average particle diameter of the primary particles by the average pore diameter (hereinafter referred to as the value of "average primary particle diameter/average pore diameter") is preferably from 0.1 to 5, more preferably from 0.4 to 4, and even more preferably from 0.3 to 3. In this case, the maximum level of lithium ion conductivity and electron conductivity in the secondary particles is obtained. That is, when the value of "average primary particle diameter/average pore diameter" is 0.1 or greater, an excessive increase in grain boundary resistance due to an excessive increase in the number of primary particles existing around the pores is prevented, and thus deterioration of output performance and rate performance can be prevented. Also, when the value of "average primary particle diameter/average pore diameter" is 5 or less, contact points between primary particles existing around the pores are increased, sufficient electron conduction paths and lithium ion diffusion paths (particularly, electron conduction paths) are ensured, and thus deterioration of output performance can be prevented.

As the lithium complex oxide that has a layered rock-salt structure and constitutes the positive electrode active material of the present invention, lithium cobaltate ($LiCoO_2$) can be typically used. Naturally, it is also possible to use a solid solution containing nickel, manganese or the like in addition to cobalt, as the lithium complex oxide constituting the positive electrode active material of the present invention. Specifically, it is possible to use lithium nickelate, lithium manganate, lithium-nickel-manganese oxide, lithium-nickel-cobalt oxide, lithium-cobalt-nickel-manganese oxide, lithium-cobalt-manganese oxide, or the like as the lithium complex oxide constituting the positive electrode active material of the present invention. Furthermore, these materials may contain one or more elements such as Mg, Al, Si, Ca, Ti, V, Cr, Fe, Cu, Zn, Ga, Ge, Sr, Y, Zr, Nb, Mo, Ag, Sn, Sb, Te, Ba, and Bi.

Specifically, it is possible to preferably use, as the lithium complex oxide constituting the positive electrode active material of the present invention, those represented by the following composition formulas:

$$Li_pMeO_2 \quad \text{Composition Formula (1):}$$

wherein, in the composition formula (1), $0.9 \leq p \leq 1.3$, and Me represents at least one metal element selected from the group consisting of Mn, Ti, V, Cr, Fe, Co, Ni, Cu, Al, Mg, Zr, B, and Mo; and $$xLi_2MO_3\text{-}(1-x)Li_pMeO_2 \quad \text{Composition Formula (2):}$$

wherein, in the composition formula (2), $0<x<1$, $0.9 \leq p \leq 1.3$, and M and Me each independently represent at least one metal element selected from the group consisting of Mn, Ti, V, Cr, Fe, Co, Ni, Cu, Al, Mg, Zr, B, and Mo.

"Me" in the above composition formulas (1) and (2) may be at least one metal element in which the average oxidation state is "+3", and is preferably at least one metal element selected from the group consisting of Mn, Ni, Co, and Fe. "M" in the above composition formula (2) may be at least one metal element in which the average oxidation state is "+4", and is preferably at least one metal element selected from the group consisting of Mn, Zr, and Ti.

A particularly preferable positive electrode active material is a nickel-cobalt-aluminum based material having a composition represented by the following general formula:

$$Li_p(Ni_x,Co_y,Al_z)O_2 \quad \text{General Formula (3):}$$

wherein, in the above general formula, $0.9 \leq p \leq 1.3$, $0.6<x \leq 0.9$, $0.05 \leq y \leq 0.25$, $0 \leq z \leq 0.2$, and x+y+z equal to 1.

In the above general formula (3), p is preferably within a range of $0.9 \leq p \leq 1.3$, more preferably within a range of $1.0 \leq p \leq 1.1$, and with p being within these ranges, it is possible to suppress outgassing inside the battery during charging while ensuring high discharge capacity. The value of x is preferably within a range of $0.6<x \leq 0.9$, and more preferably within a range of 0.7 to 0.85, and with x being within these ranges, it is possible to ensure high discharge capacity and high stability. The value of y is preferably within a range of $0.05 \leq y \leq 0.25$, more preferably within a range of 0.10 to 0.20, and with y being within these ranges, it is possible to stabilize the crystal structure and to ensure high discharge capacity.

The value of z is preferably within a range of $0 \leq z \leq 0.2$, more preferably is preferably within a range of 0.01 to 0.1, and with z being within these ranges, it is possible to ensure high discharge capacity.

Method for Producing Positive Electrode Active Material for Lithium Secondary Batteries The positive electrode active material for lithium secondary batteries of the present invention may be produced by any method, and a technique may be used in which a pore-forming agent (void-forming material) as an additive is blended with the raw material in order to achieve a desired voidage and average pore diameter. Examples of possible such pore-forming agents include granular or fibrous substances composed of organic synthetic resins, which decompose (mainly vaporize or carbonize) in a calcination step. However, according to the inventors' findings, when the amount of the pore-forming agent is reduced to decrease the amount of voids for the purpose of increasing the energy density, voids are less likely to be in communication with each other and thus form closed pores, possibly resulting in deterioration of output performance. Accordingly, a method by which a desired voidage and average pore diameter can be achieved without using such a pore-forming agent will now be described below as a preferable method.

The method of the present invention comprises at least primarily compacting and drying a first raw material slurry containing a raw material powder into a sheet form to obtain a primary compact, pulverizing the primary compact to obtain a primary compact powder, and producing a secondary compact powder using a second raw material slurry containing the primary compact powder. The secondary compact powder may be a positive electrode active material precursor in which lithium to be added in the subsequent step may be absent or deficient, or may be a positive electrode active material containing the necessary amount of lithium, or a precursor thereof (a lithium mixed powder). After the secondary compact powder is mixed with a lithium compound as necessary, the lithium mixed powder is fired to allow the secondary compact powder to react with the lithium compound. In this way, in the method of the present invention, it is possible without using a pore-forming agent, to produce a positive electrode active material having a desired voidage and a high open pore ratio, which brings high battery performance, or a precursor thereof, by conducting compacting and powdering of a raw material twice. In the present invention, it is a matter of course that compacting and powdering may be conducted three or more times, and this makes it possible to attain effects equivalent to or better than those of the present invention.

That is, in the method of the present invention, a raw material slurry is subjected to compacting and drying to obtain a sheet-like compact as a primary compact first. Then, a flaky primary compact powder obtained by drying and pulverizing the sheet-like primary compact is reslurried and subjected to secondary compacting to obtain a secondary compact powder. In the secondary compact powder thus obtained, numerous spaces are formed between the particles of the primary compact powder constituting the secondary compact powder due to the flaky shape of the primary compact powder. When the secondary compact powder is fired, as shown in FIG. 1, the numerous spaces result in numerous voids V which are likely to be finely in communication with the outside of the positive electrode active material as a fired body, and open pores are likely to form even when the amount of voids is reduced. As mentioned above, it is also possible to use a technique in which voids are formed by taking advantage of melting or vaporization of a pore-forming agent included therein upon firing or calcination. In this case, however, there is a problem in that, when the amount of voids is decreased by reducing the amount of the pore-forming agent so as to increase the volume energy density, the voids are less likely to be in communication with each other, and thus closed pores are likely to be formed, resulting in deterioration of output performance. Moreover, although pores can be formed by adjusting the firing temperature or the like, it is also problematic in that closed pores are formed in the region where the amount of voids is small. Such problems are effectively solved or alleviated according to the method of the present invention.

The respective steps in the method of the present invention will now be specifically described below.

(1) Preparation of First Raw Material Slurry

In the method of the present invention, a first raw material slurry containing a raw material powder comprising at least one metal compound is prepared. As a raw material powder, it is possible to use a powder comprising particles composed of at least one metal compound, in which particles of compounds of Li, Co, Ni, Mn, Al or the like are suitably mixed such that the positive electrode active material to be eventually obtained has a composition of $LiMO_2$ (M is any metal element). For example, it is possible to use mixed particles of respective compounds of Co, Ni, Mn, Al and the like (mixed particles having compositions such as $(Co,Ni,Mn)O_x$, $(Co,Ni,Al)O_x$, $(Co,Ni,Mn)OH_x$, $(Co,Ni,Al)OH_x$ and the like) containing no lithium compound. This is because it is sufficient that lithium is added in the lithium mixing step, which will be described below. Preferably, at least one of the metal compounds is an oxide, a hydroxide and/or a carbonate of at least one metal selected from the group consisting of Co, Ni, Mn and Al. Compacting these mixed particles and allowing the resultant compact to react with a lithium compound make it possible to obtain positive electrode active material particles having a predetermined composition. Also, these particles may be either in the form of a mixed powder of particles of two or more metal compounds, or particles composed of a complex compound synthesized by a coprecipitation method.

It is preferable to use a hydroxide having a composition of $(Co,Ni,Mn)OH_x$, $(Co,Ni,Al)OH_x$ or the like as a raw material powder for the purpose of increasing the orientation ratio of the individually oriented secondary particles. That is, in the raw material powder, at least one of the metal compounds preferably contains a hydroxide of at least one metal selected from the group consisting of Co, Ni, Mn and Al. Such hydroxide has a primary particle having a plate-like shape, along which the (001) plane lies, and it is therefore easy to orient the primary particles by the compacting step, which will be described below. The orientation of this (001) plane is inherited by the (003) plane in the positive electrode active material with a predetermined composition when the hydroxide reacts with a lithium compound. Therefore, the (003) planes in the positive electrode active material particles can be easily oriented by using the plate-like raw material powder.

Considering promotion of grain growth or lithium volatilization during firing, a larger amount of the lithium compound may be introduced into the raw material powder so as to give an excess lithium amount of 0.1 to 40 mol %. In addition, for the purpose of promoting grain growth, a low-melting point oxide (such as bismuth oxide), a low-melting point glass (such as borosilicate glass), lithium fluoride, lithium chloride, boron oxide or the like may be added to the raw material powder in an amount of 0.001 to 30% by mass.

Part of the raw material powder may be replaced by another raw material. For example, Mn in $(Co,Ni,Mn)OH_x$ may be partially replaced by $MnCO_3$. This allows sufficient orientation to be achieved, and also results in a large volume change during thermal decomposition, thus making it possible to alter the pore size and the voidage.

(2) Primary Compacting Step

The first raw material slurry is compacted and dried to provide a sheet-like primary compact. This makes it possible to obtain a primary compact in which numerous primary particles are oriented. This sheet-like compact is preferably a self-standing compact having a thickness of 120 μm or less. In principle, the "self-standing compact" is a compact that can retain its sheet-like shape by itself. Even if a compact temporarily fails to retain the sheet-like compact shape by itself, this compact once formed into a sheet by lamination or deposition onto a substrate and then peeled off from the substrate before or after firing is encompassed within the "self-standing compact". Specifically, a sheet obtained by extrusion compacting is a "self-standing compact" from immediately after compacting. On the other hand, although a film formed by application of a slurry cannot be handled as an independent object before it is dried, the film after being dried and then peeled from a substrate is a "self-standing compact". The concept of being "sheet-like" includes being plate-like, flaky, scaly, and the like.

There is no particular limitation on the compacting method as long as a raw material powder is packed in a compact, with its crystal orientation being aligned. For example, by subjecting a slurry containing a raw material powder to film formation (compacting) using a doctor blade method, it is possible to obtain a (self-standing, sheet-like) compact in which the raw material powder is packed, with its crystal orientation being aligned. Specifically, when using a doctor blade method, a slurry containing a raw material powder is first applied to a flexible substrate (for example, an organic polymer sheet such as a PET film), and then the applied slurry is solidified by drying to form a dried film. Then, peeling this dried film from the above substrate gives a compact in which the raw material powder is oriented (packed, with the crystal orientation being aligned).

In addition, the above compact can be obtained by using a drum dryer, applying a slurry containing a raw material powder onto the heated drum to dry the slurry, and scraping off the dried product from the drum with a scraper. It is further possible to obtain the above compact by using a disk dryer, applying a slurry containing a raw material powder onto a surface of the heated disk to dry the slurry, and scraping off the dried product with a scraper. It is also possible to obtain the above compact by extrusion compacting using a green body containing a raw material powder.

Alternatively, controlling the density or the manner of crystal growth of a raw material powder also makes it possible to synthesize, using the raw material powder as it is or after lightly pulverizing it, the compact in which the (003) planes are oriented so as not to intersect each other at least in one axial direction (preferably, so as to be approximately parallel to each other) without compacting the row material powder into a sheet form. In this case, the compact pulverization step (3), which will be described below, can be omitted.

In the stage of preparing a slurry or a green body before compacting, a binder, a plasticizer or the like may be suitably added, or may not be added, to a dispersion obtained by dispersing a raw material powder in an appropriate dispersion medium. The type or the amount of additives such as a binder is suitably adjusted so as to be able to control the packing density or the degree of orientation of the raw material powder during compacting, or to control the shape of a pulverized powder in the compact pulverization step, which will be described below, to a desired state. Specifically, for example, high flexibility of the compact before pulverization tends to result in a high aspect ratio of the pulverized powder during pulverization. For this reason, the type or the amount of a binder, a plasticizer, or the like can be suitably adjusted so as not to excessively increase the flexibility of the compact before pulverization. Therefore, for example, in order to control the flexibility of the compact before pulverization, the compact may be dried at about 200 to 500° C. at which denaturation or decomposition of the binder occurs.

When using a slurry containing a raw material powder, it is preferable to adjust the viscosity to within the range from 0.1 to 5 Pa·s or to conduct defoaming under reduced pressure. Furthermore, when another compound is allowed to exist in the pores V, it is preferable to prepare a slurry containing this compound and a raw material powder.

The thickness of the compact is preferably 120 μm or less, more preferably 100 μm or less, particularly preferably 30 μm or less. The thickness of the compact is preferably 1 μm or greater. The thickness of the compact being 1 μm or greater facilitates production of a self-standing, sheet-like compact. The thickness of the compact is suitably adjusted according to the application of the particles since the thickness is a direct factor which determines the average particle diameter of positive electrode active material particles.

(3) Compact Pulverization Step

The sheet-like primary compact is pulverized to form a flaky primary compact powder composed of numerous oriented primary particles. Examples of the pulverization method include a method of pressing against a mesh using a spatula; a method of pulverization using a pulverizing machine with a weak pulverizing force, such as a pin mill; a method in which sheet strips are collided with each other in an air current (specifically, a method of charging in an air classifier); a method using a revolving jet mill; a pot pulverization method; and a barrel polishing method. Alternatively, pulverization may be conducted so as to impart a desired size to the powder when a sheet-like primary compact adhering to a drum is peeled off, and examples of such a technique include techniques in which unevenness is imparted to a drum, or the surface is dried by heating from outside.

The average aspect ratio of the primary compact powder is preferably 1.2 or greater, more preferably from 1.2 to 20, and even more preferably from 1.5 to 10. The primary compact powder preferably has an average particle diameter of 0.5 to 25 μm, more preferably 1 to 25 μm, and even more preferably 2 to 10 μm. Suitable adjustments of the average aspect ratio and the average particle diameter within the above ranges enable production of a positive electrode active material having a desired voidage and a high open pore ratio through the secondary compacting, which will be described below. Therefore, it is preferable that the primary compact powder is subjected to classification by air classification, sieving, elutriation or the like before formation of a second raw material slurry so that the primary compact powder has a desired average particle diameter (for example, 0.5 to 25 μm). During classification, fine particles with a size of 1 μm or less may be allowed to remain by adjusting a classification point, or fine powders with 1 μm or less may be added in a certain ratio. This makes it possible to suitably alter the voidage and the open pore ratio of the secondary compact.

(4) Reslurrying Step

The primary compact powder is used to form a second raw material slurry. The second raw material slurry may be prepared by mixing the primary compact powder with a dispersion medium such as water, or may be prepared by mixing both the raw material powder and the primary compact powder with a dispersion medium such as water. A binder or a dispersing agent may or may not be added. In this way, the voidage and the open pore ratio can be suitably altered by controlling the ratio between the raw material powder and the primary compact powder in the second raw material slurry. When the second raw material slurry contains a raw material powder and a primary compact powder, the ratio of the raw material powder to the total amount of the raw material powder and the primary compact powder is preferably 50% by mass or less, and more preferably 30% by mass or less. It is also possible to control the voidage and the open pore ratio by adjusting the particle size distribution of the primary compact.

(5) Secondary Compacting Step

The second raw material slurry is used to produce a secondary compact powder. In this secondary compacting step, any technique can be employed without particular limitations as far as the secondary compact powder is produced using the second raw material slurry. In particular, exact conditions are not requited for the secondary compact powder as compared to the primary compact powder. This is because the secondary compact powder takes over the basic physical properties of the flaky primary compact powder that constitutes the secondary compact powder, and is subjected to secondary compacting merely from the viewpoint of randomly agglomerating the primary compact powder while attaining a desired voidage and open pore ratio.

The step of preparing the secondary compact powder is preferably conducted by spray-drying the second raw material slurry, and it is thereby possible to obtain the secondary compact powder as agglomerated particles composed of numerous non-oriented secondary particles. That is, by not conducting an orientation control process during spray-drying, domain-oriented agglomerated particles, which contains numerous individually oriented secondary particles randomly, can be obtained after firing.

(6) Lithium Mixing Step

Optionally, the pulverized powder is mixed with a lithium compound to form a lithium mixed powder. Any lithium-containing compound capable of eventually providing the composition $LiMO_2$ of the positive electrode active material can be used as the lithium compound, and preferable examples thereof are lithium hydroxide and lithium carbonate. Prior to the reaction, the pulverized powder is preferably mixed with the lithium compound by a technique such as dry mixing or wet mixing. The average particle diameter of the lithium compound is not particularly limited, and it is preferably from 0.1 to 5 μm from the view point of reactivity as well as handling ability due to hygroscopicity. In order to enhance the reactivity, the amount of lithium may be in an excess of about 0.1 to about 40 mol %. Naturally, the secondary compact powder may be a lithium mixed powder containing a lithium compound, and if its lithium content sufficiently satisfies the necessary amount, the lithium mixing step can be omitted.

The domain-oriented agglomerated particle precursor may be heat-treated before being mixed with lithium. Performing heat treatment on the precursor before mixing it with lithium enables removal of thermally decomposable components such as a hydroxide group contained in the precursor, and it is thus possible to enhance reactivity with lithium in the subsequent firing step. The heat treatment temperature is preferably from 400° C. to 1000° C. A sufficient thermal decomposition effect is attained at a temperature of 400° C. or higher, while a rapid progress of grain growth is suppressed at a temperature of 1000° C. or lower, and it is thus possible to avoid deterioration of reactivity with lithium in the firing step.

(7) Firing Step (Lithium Introduction)

Optionally, the lithium mixed powder is fired to allow the secondary compact powder to react with the lithium compound, thereby providing a positive electrode active material for lithium secondary batteries, which contains open pores. At this time, firing the above unfired mixture by a suitable method allows lithium to be introduced into the positive electrode active material precursor particles, thereby providing positive electrode active material particles. For example, firing may be conducted by putting a saggar containing the above unfired mixture into a furnace. This firing induces synthesis of the positive electrode active material, moreover, sintering and grain growth of particles, and, at the same time, formation of open pores resulting from the spaces between flaky primary compact powder particles. At this time, as described above, the (001) planes of the raw material powder can be oriented in the compact (positive electrode active material precursor particles), and therefore, with the crystal orientation being inherited, positive electrode active material particles having a predetermined composition can be obtained in which the (003) planes are favorably oriented.

The firing temperature is preferably from 600° C. to 1100° C., and when the temperature is within this range, grain growth is sufficient and a high orientation ratio is attained, and also decomposition of the positive electrode active material and volatilization of lithium are suppressed, and thus the desired composition is more likely to be achieved. The firing time is preferably from 1 to 50 hours, and when the time is within this range, a high orientation ratio is attained, and also an excessive increase of energy consumption for firing can be prevented.

In addition, the temperature retention may be conducted for 1 to 20 hours at a temperature (e.g., 400 to 600° C.) lower than the firing temperature, in order to enhance the reactivity between lithium and the precursor mixed in the heating process. Since lithium melts through this temperature retention step, the reactivity can be enhanced. A similar effect can be obtained by adjusting the temperature rising rate in a certain temperature range (e.g., 400 to 600° C.) in this firing (lithium introduction) step.

The firing atmosphere needs to be suitably set so that decomposition does not proceed during firing. In such a case where volatilization of lithium proceeds, it is preferable to place lithium carbonate or the like in the same saggar in order to create lithium atmosphere. In such a case where release of oxygen or, moreover, reduction proceeds during the firing, it is preferable that the firing be conducted in an atmosphere under a high oxygen partial pressure. In order to release the mutual adhesion or agglomeration of the positive electrode active material particles or to adjust the average particle diameter of the positive electrode active material particles, a pulverization or classification may be suitably conducted after firing. Such pulverization or classification may be referred to as "secondary pulverization" or "secondary classification" since these are performed after the above-described pulverization or classification before firing.

In addition, post-heat treatment may be conducted at 100 to 400° C. on the fired positive electrode active material that has optionally undergone the pulverization or classification step. Such post-heat treatment step makes it possible to modify the surface layer of the primary particles and thus improves rate performance and output performance. In addition, water washing treatment may be conducted on the fired positive electrode active material that has optionally undergone the pulverization or classification step. Such water washing treatment step makes it possible to remove the unreacted lithium raw material remaining on the surface of the positive electrode active material powder or remove lithium carbonate formed by adsorption of moisture and carbon dioxide present in air onto the surface of the positive electrode active material powder, and thus improves high-temperature storage performance (in particular, suppression of gas generation).

EXAMPLES

The present invention will now be more specifically described by way of the following examples. Measurement methods of various properties and evaluation methods of various performances are as presented below.

<Diameter of Primary Compact Particles (μm)>

Using an FE-SEM (field emission scanning electron microscope: manufactured by JEOL Ltd., under the product name of "JSM-7000F"), an SEM image was taken at a magnification selected so as to include 10 or more primary compact particles in the field of view. In this SEM image, a circumscribed circle was drawn on each of the 10 primary compact particles to determine the diameter of the circumscribed circle. The average of the obtained 10 diameters was regarded as the diameter of primary compact particles.

<Diameter of Primary Particles (μm)>

Using an FE-SEM, an SEM image was taken at a magnification selected so as to include 10 or more primary particles of a fired body in the field of view. In this SEM image, a circumscribed circle was drawn on each of the 10 primary particles to determine the diameter of the circumscribed circle. The average of the obtained 10 diameters was regarded as the diameter of primary particles.

<Aspect Ratio of Primary Particles>

Using an FE-SEM, an SEM image was taken at a magnification selected so as to include 10 or more primary particles in the field of view. In this SEM image, the major axis diameter and the minor axis diameter of each of the 10 primary particles were determined, and then a value was obtained by dividing the major axis diameter by the minor axis diameter. The average of the obtained 10 values was regarded as the aspect ratio.

<Diameter of Domain-Oriented Agglomerated Particles (μm)>

Using an FE-SEM, an SEM image was taken at a magnification selected so as to include 10 or more secondary particles of a fired body in the field of view. In this SEM image, a circumscribed circle was drawn on each of the 10 secondary particles to determine the diameter of the circumscribed circle. The average of the obtained 10 diameters was regarded as the diameter of domain-oriented agglomerated particles.

<Average Pore Diameter (μm)>

The average pore diameter was measured by a mercury intrusion method using a mercury intrusion porosimeter (manufactured by Shimadzu Corporation under the apparatus name of "Autopore IV 9510").

<Voidage (%)>

A positive electrode active material was embedded in a resin, followed by polishing using a cross-section polisher (CP) so as to enable observation of the polished cross-section of the positive electrode active material, and then a cross-sectional image was obtained by an SEM (scanning electron microscope "JSM-6390LA", manufactured by JEOL Ltd.). This image was image-processed to define a void portion and a positive electrode material portion in the cross-section, and then (area of void portion)/(area of void portion+area of positive electrode material) was determined. This procedure was carried out on 10 secondary particles to determine the average, which was regarded as voidage.

<Open Pore Ratio (%)>

In the above method for evaluating the voidage, the open pore ratio was determined using the formula: (area of open pore portion)/(area of open pore portion+area of closed pore portion) where the open pore portion corresponds to the void portion impregnated with the resin and the closed pore portion corresponds to the void portion not impregnated with the resin. This procedure was carried out on 10 secondary particles to determine the average thereof as an open pore ratio. Resin embedding was conducted while sufficiently expelling the air existing in the open pores using a vacuum impregnation system (manufactured by Struers Corp. under the apparatus name of "CitoVac") so as to sufficiently impregnate the open pores with the resin.

<Orientation Ratio (%)>

A powder of secondary particles was placed on a glass substrate so as to minimize the overlap of secondary particles, then this powder after being transferred to adhesive tape and embedded in synthetic resin was polished so as to enable observation of the plate surface or the polished cross-section of the secondary particles, and thereby a sample for observation was prepared. For observation of the plate surface, polishing with a vibration-assisted rotary polisher was conducted using colloidal silica (0.05 μm) as a polishing agent for final polishing. On the other hand, for observation of the cross-section, polishing was conducted with a cross-section polisher. On the sample prepared in this way, a crystal orientation analysis of each secondary particle was performed in the field of view where 10 or more primary particles were observed per secondary particle using EBSD (an electron backscatter diffraction method, with measurement software "OIM Data Collection" and analysis software "OIM Analysis" manufactured by TSL Solutions), with the pixel resolution for measurement being 0.1 μm. Accordingly, the angle of inclination of the (003) plane of each primary particle relative to the measurement surface (polished surface) was determined. A histogram (angle distribution) of the number of particles relative to the angle was output, and the angle at which the number of primary particles became maximum (peak value) was regarded as the angle of inclination $\theta$ of the (003) planes relative to the measurement surface of the secondary particle. Concerning the measured secondary particle, the number of primary particles the (003) planes of which are within $\theta \pm 10$ degrees of this angle of inclination $\theta$ was calculated. The number of primary particles thus obtained was divided by the total number of primary particles to calculate the orientation ratio of (003) planes in the measured secondary particle. This procedure was performed on 10 different secondary particles, and the average was regarded as the orientation ratio of (003) planes.

<Orientation State>

When determining the above orientation ratio, those oriented in the one axial direction were classified as being "uniaxially oriented", those having an orientation ratio of 20% or less if viewed as a whole but containing particles in which a plurality of primary particles had the same displaced angle were regarded as being "domain-uniaxially-oriented", and those in which the direction of orientation was different at the primary particle level and which had an orientation ratio of 20% or less were regarded as being "non-oriented".

<Diameter of Individually Oriented Secondary Particles (μm)>

When measuring the above orientation state, 10 particles in which a plurality of primary particles had the same displaced angle were selected, and a circumscribed circle was drawn on each particle to determine the diameter of the circumscribed circle. The average of the obtained 10 diameters was regarded as the diameter of individually oriented secondary particles.

<Output Performance>

For the evaluation of battery performance, a coin cell battery was manufactured in the following manner. Specifically, the obtained secondary particle powder, acetylene black and polyvinylidene fluoride (PVDF) were mixed in a mass ratio of 90:5:5, and then the mixture was dispersed in N-methyl-2-pyrrolidone to prepare a positive electrode active material paste. The obtained paste was applied to an aluminum foil having a thickness of 20 μm as a positive electrode current collector so as to obtain a uniform thickness (a thickness after drying of 50 μm). The resultant dried sheet was stamped into disks each having a diameter of 14 mm, followed by pressing under a pressure of 2000 kg/cm² to produce a positive electrode plate. The positive electrode plate thus obtained was used to prepare a coin cell. An electrolytic solution was prepared by dissolving $LiPF_6$ to a concentration of 1 mol/L in an organic solvent prepared by mixing ethylene carbonate (EC) with an equal volume of diethyl carbonate (DEC).

The cell for characteristic evaluation thus obtained (coin cell) was used to evaluate its output performance by conducting charge/discharge operations in the following manner. Specifically, constant current charging was conducted at a current value of 0.1 C rate until the cell voltage reached 4.3 V. Thereafter, constant voltage charging was conducted under current conditions where the cell voltage was maintained at 4.3 V until the current value dropped to 1/20. After pausing for 10 minutes, constant current discharging was conducted at a current value of 2 C rate until the cell voltage reached 2.5 V, followed by pausing for 10 minutes. These charge/discharge operations were regarded as one cycle, and repeated for a total of 2 cycles under 25° C. conditions. Thereafter, direct current discharging was conducted for 10 seconds at 2 C at a discharge voltage corresponding to 90% discharge capacity, with the discharge capacity in the second cycle being 100% (SOC 10% voltage: SOC stands for "state of charge"), and the rate of potential change was regarded as output performance. A smaller numerical value thereof indicates better output performance.

<Output Performance Retention Rate after 100 Cycles>

The sample after the above output performance evaluation was subjected to 100 cycles at a charge/discharge rate of 1 C at 25° C., then the output performance was evaluated again, and the numerical value divided by the initial value was regarded as the output performance retention rate.

Example 1

Non-Oriented Comparative Example Using Pore-Forming Agent (Active Material Precursor: Ni-Based)

(1) Preparation of Raw Material Particles and Slurry

First, a $Ni(OH)_2$ powder (manufactured by KOJUNDO CHEMICAL LABORATORY CO., LTD.), a $Co(OH)_2$ powder (manufactured by KOJUNDO CHEMICAL LABORATORY CO., LTD.), and $Al_2O_3.H_2O$ (manufactured by SASOL Limited) were weighed so as to provide a Ni:Co:Al molar ratio of 81:15:4 in the mixture. Then, a pore-forming agent (spherical: manufactured by Air Water Inc. under the trade name of "Bellpearl R100") was added to the weighed mixture. The pore-forming agent was weighed such that the ratio of the pore-forming agent to the total weight of the powder after addition was 1%. After the addition of the pore-forming agent, the mixed powder was ground and mixed with a ball mill for 24 hours to prepare a powder of raw material particles. 100 parts of the prepared powder of raw material particles, 400 parts of pure water as a dispersion medium, 1 part of a binder (polyvinyl alcohol: product number VP-18, manufactured by JAPAN VAM & POVAL CO., LTD.), 1 part of a dispersing agent (manufactured by NOF CORPORATION under the product name of "Mariarim KM-0521"), and 0.5 parts of a defoaming agent (1-octanol: manufactured by Wako Pure Chemical Industries, Ltd.) were mixed. Furthermore, this mixture was defoamed by stirring under reduced pressure, and also the viscosity thereof was adjusted to 0.5 Pa·s (measured using an LVT viscometer manufactured by Brookfield) to prepare a slurry.

(2) Compacting of Raw Material Particles

A spherical compact was obtained using a spray dryer (manufactured by OHKAWARA KAKOHKI CO., LTD.: model type OC-16) under conditions of a fluid volume of 150 g/min, an inlet temperature of 160° C., and an atomizer revolution speed of 25000 rpm. The resulting compact was calcined by raising the temperature to 600° C. at 50° C./hour and maintaining the compact at 600° C. for 3 hours.

(3) Mixing with Lithium Compound

The powder after fine particle removal was mixed with a LiOH.H$_2$O powder (manufactured by Wako Pure Chemical Industries, Ltd.) to give a molar ratio Li/(Ni$_{0.81}$Co$_{0.15}$Al$_{0.04}$) of 1.05.

(4) Firing Step (Lithium Introduction Step)

The above mixed powder was charged into a high purity alumina crucible, the temperature was raised at 50° C./hour in an oxygen atmosphere (0.1 MPa), and heat treatment was performed at 760° C. for 24 hours to obtain a Li(Ni$_{0.81}$CO$_{0.15}$Al$_{0.04}$)O$_2$ powder. The positive electrode active material thus obtained was subjected to various measurements, and the results shown in Table 1 were obtained.

(5) Pulverization/Classification Step

The resulting powder was pulverized with a pin mill (manufactured by Hosokawa Micron Corporation under the trade name of "Fine Impact Mill", model type 160 UPZ, revolution speed of 5000 rpm) and then adjusted to give the desired particle size with an air classifier (manufactured by Nisshin Engineering, Ltd. under the trade name of "TURBO CLASSIFIER, model type TC-15).

Examples 2 and 3

Oriented Comparative Examples Using Pore-Forming

Agent (Active Material Precursor: Ni-Based)

(1) Preparation of Raw Material Particles and Slurry

First, a Ni(OH)$_2$ powder (manufactured by KOJUNDO CHEMICAL LABORATORY CO., LTD.), a Co(OH)$_2$ powder (manufactured by KOJUNDO CHEMICAL LABORATORY CO., LTD.), and Al$_2$O$_3$.H$_2$O (manufactured by SASOL Limited) were weighed so as to provide a Ni:Co:Al molar ratio of 81:15:4 in the mixture. Then, a pore-forming agent (spherical: manufactured by Air Water Inc. under the trade name of "Bellpearl R100") was added to the weighed mixture. The pore-forming agent was weighed such that the ratio of the pore-forming agent to the total weight of the powder after addition was 3% (Example 2) or 5% (Example 3). After the addition of the pore-forming agent, the mixed powder was ground and mixed with a ball mill for 24 hours to prepare a powder of raw material particles. 100 parts of the prepared powder of raw material particles, 400 parts of pure water as a dispersion medium, 1 part of a binder (polyvinyl alcohol: product number VP-18, manufactured by JAPAN VAM & POVAL CO., LTD.), 1 part of a dispersing agent (manufactured by NOF CORPORATION under the product name of "Mariarim KM-0521"), and 0.5 parts of a defoaming agent (1-octanol: manufactured by Wako Pure Chemical Industries, Ltd.) were mixed. Furthermore, this mixture was defoamed by stirring under reduced pressure, and also the viscosity thereof was adjusted to 0.5 Pa·s (measured using an LVT viscometer manufactured by Brookfield) to prepare a slurry.

(2) Compacting of Raw Material Particles

The slurry prepared in the above manner was compacted into a sheet on a PET film by a doctor blade method so as to provide a post-drying thickness of 25 μm. The resulting compact was calcined by raising the temperature to 600° C. at 50° C./hour and maintaining the compact at 600° C. for 3 hours.

(3) Pulverization/Spheronization Process and Classification of Compact

The ceramic sheet thus obtained was placed on a sieve (mesh) having an opening diameter of 30 μm and passed through the mesh for pulverization while being lightly pressed with a spatula, so as to obtain an approximately spherical (Ni$_{0.81}$Co$_{0.15}$Al$_{0.04}$)O powder. The powder obtained through pulverization was charged into an air classifier (manufactured by Nisshin Engineering, Ltd. under the product name of "TURBO CLASSIFIER", model type TC-15, volume of discharged air 1.7 m$^3$/min, classification rotor revolution speed of 10000 rpm) at a rate of 20 g/min to obtain a powder, and coarser particles in the resulting powder were recovered. This spheronization process (in which classification by fine particle removal was also conducted simultaneously) was repeated five times.

(4) Mixing with Lithium Compound

The powder after fine particle removal was mixed with a LiOH.H$_2$O powder (manufactured by Wako Pure Chemical Industries, Ltd.) such that the molar ratio of Li/(Ni$_{0.81}$Co$_{0.15}$Al$_{0.04}$) was 1.05.

(5) Firing Step (Lithium Introduction Step)

The above mixed powder was charged into a crucible made of high purity alumina, the temperature was raised at 50° C./hour in an oxygen atmosphere (0.1 MPa), and heat treatment was performed at 760° C. for 24 hours to obtain a Li(Ni$_{0.81}$Co$_{0.15}$Al$_{0.04}$)O$_2$ powder.

(6) Pulverization/Classification Step

The obtained powder was pulverized with a pin mill (manufactured by Hosokawa Micron Corporation under the trade name of "Fine Impact Mill", model type 160 UPZ, revolution speed of 5000 rpm) and then adjusted to the desired particle size by an air classifier (manufactured by Nisshin Engineering, Ltd. under the trade name of "TURBO CLASSIFIER, model type TC-15). The positive electrode active material thus obtained was subjected to various measurements, and the results shown in Table 1 were obtained.

Examples 4 to 7

Examples Conducting Secondary Compacting (Active Material Precursor: Ni-Based)

(1) Preparation of Raw Material Particles and Slurry

First, a Ni(OH)$_2$ powder (manufactured by KOJUNDO CHEMICAL LABORATORY CO., LTD.), a Co(OH)$_2$ powder (manufactured by KOJUNDO CHEMICAL LABORATORY CO., LTD.), and Al$_2$O$_3$—H$_2$O (manufactured by SASOL Limited) were weighed so as to provide a Ni:Co:Al molar ratio of 81:15:4 in the mixture. Then, the mixed powder was ground and mixed with a ball mill for 24 hours to prepare a powder of raw material particles. 100 parts of the prepared powder of raw material particles was mixed with 400 parts of pure water as a dispersion medium. Furthermore, this mixture was defoamed by stirring under reduced pressure, and also the viscosity thereof was adjusted to 0.5 Pa·s (measured using an LVT viscometer manufactured by Brookfield) to prepare a slurry.

(2) Production of Primary Compact

The slurry prepared in the above manner was compacted into a sheet on a PET film by a doctor blade method so as to provide the post-drying thickness shown in Table 1. The sheet-like compact peeled from the PET film after drying was pulverized with Fine Impact Mill (manufactured by Hosokawa Micron Corporation), and then the resulting powder was classified so as to provide the desired particle diameter shown in Table 1 by using an air classifier (manufactured by Nisshin Engineering, Ltd. under the trade name of TURBO CLASSIFIER, model type TC-15). The orientation ratio of the primary compact powder was measured and found to be 90%.

(3) Production of Secondary Compact 100 parts of a mixed powder containing the resulting primary compact powder and the raw material powder prepared in step (1) with the mixing ratio shown in Table 1 was mixed with 300 parts of pure water as a dispersion medium. From the resulting slurry, a spherical compact was obtained using a spray dryer (manufactured by OHKAWARA KAKOHKI CO., LTD.: model type OC-16) under conditions of a fluid volume of 150 g/min, an inlet temperature of 160° C., and an atomizer revolution speed of 25000 rpm.

(4) Firing Step (Lithium Introduction Step)

The above spherical compact was charged into a high purity alumina crucible, the temperature was raised at 50° C./hour in an oxygen atmosphere (0.1 MPa), and heat treatment was performed at 760° C. for 24 hours to obtain a $Li(Ni_{0.81}Co_{0.15}Al_{0.04})O_2$ powder.

(5) Pulverization/Classification Step

The obtained powder was pulverized with a pin mill (manufactured by Hosokawa Micron Corporation under the trade name of "Fine Impact Mill", model type 160 UPZ, revolution speed of 5000 rpm) and then adjusted to give the desired particle size with an air classifier (manufactured by Nisshin Engineering, Ltd. under the trade name of "TURBO CLASSIFIER, model type TC-15). The positive electrode active material thus obtained was subjected to various measurements, and the results shown in Table 1 were obtained.

Example 8

Non-Oriented Comparative Example Using Pore-Forming Agent (Active Material Precursor: Ternary System)

A $Li(Ni_{0.5}Co_{0.2}Mn_{0.3})O_2$ powder was prepared in the same manner as in Example 1, except that the weighing conditions and the firing (lithium introduction) conditions in the preparation of raw material particles were altered as follows. That is, in the preparation of raw material particles, a $Ni(OH)_2$ powder (manufactured by KOJUNDO CHEMICAL LABORATORY CO., LTD.), a $Co(OH)_2$ powder (manufactured by KOJUNDO CHEMICAL LABORATORY CO., LTD.), and a $MnCO_3$ powder (manufactured by TOSOH CORPORATION) were weighed so as to provide a Ni:Co:Mn molar ratio of 0.5:0.2:0.3 in the mixture. At this time, the pore-forming agent was weighed such that the ratio of the pore-forming agent to the total weight of the powder after addition was 1%. In the firing (lithium introduction), heat treatment was conducted in air at 850° C. for 20 hours. The positive electrode active material thus obtained was subjected to various measurements, and the results shown in Table 2 were obtained.

Example 9

Oriented Comparative Example Using Pore-Forming Agent (Active Material Precursor: Ternary System)

A $Li(Ni_{0.5}Co_{0.2}Mn_{0.3})O_2$ powder was prepared in the same manner as in Examples 2 and 3, except that the weighing conditions and the firing (lithium introduction) conditions in the preparation of raw material particles were altered as follows. That is, in the preparation of raw material particles, a $Ni(OH)_2$ powder (manufactured by KOJUNDO CHEMICAL LABORATORY CO., LTD.), a $Co(OH)_2$ powder (manufactured by KOJUNDO CHEMICAL LABORATORY CO., LTD.), and a $MnCO_3$ powder (manufactured by TOSOH CORPORATION) were weighed so as to provide a Ni:Co:Mn molar ratio of 0.5:0.2:0.3 in the mixture. At this time, the pore-forming agent was weighed such that the ratio of the pore-forming agent to the total weight of the powder after addition was 3%. In the firing (lithium introduction), heat treatment was conducted in air at 850° C. for 20 hours. The positive electrode active material thus obtained was subjected to various measurements, and the results shown in Table 1 were obtained.

Example 10

Example Conducting Secondary Compacting (Active Material Precursor: Ternary System)

A $Li(Ni_{0.5}Co_{0.2}Mn_{0.3})O_2$ powder was prepared in the same manner as in Examples 4 to 7, except that the weighing conditions and the firing (lithium introduction) conditions in the preparation of raw material particles were altered as follows. That is, in the preparation of raw material particles, a $Ni(OH)_2$ powder (manufactured by KOJUNDO CHEMICAL LABORATORY CO., LTD.), a $Co(OH)_2$ powder (manufactured by KOJUNDO CHEMICAL LABORATORY CO., LTD.), and a $MnCO_3$ powder (manufactured by TOSOH CORPORATION) were weighed so as to provide a Ni:Co:Mn molar ratio of 0.5:0.2:0.3 in the mixture. In the firing (lithium introduction), heat treatment was conducted in air at 850° C. for 20 hours. The positive electrode active material thus obtained was subjected to various measurements, and the results shown in Table 1 were obtained.

Example 11

Non-Oriented Comparative Example Using Pore-Forming Agent (Active Material Precursor: Solid Solution-Based)

A solid solution-based secondary particle powder was prepared in the same manner as in Example 1, except that the preparation conditions of raw material particles were altered as follows and the conditions shown in Table 1 were adopted. That is, an aqueous sulfate mixed solution of Ni, Co and Mn was synthesized so as to provide a Co:Ni:Mn molar ratio of 16.3:16.3:67.5 in the mixture, and the synthesized aqueous sulfate mixed solution was allowed to react with NaOH in a hot bath at 50° C. to obtain a coprecipitated hydroxide. The resulting coprecipitated hydroxide was ground and mixed for 16 hours with a ball mill to obtain a powder of raw material particles. Bismuth oxide (manufactured by TAIYO KOKO CO., LTD.) was added to the powder of raw material particles so as to be 0.5% by weight based on the total weight after addition. In the evaluation of output performance, "4.3 V" as used in the above charge/discharge operation was changed to "4.8 V", and also "2.5 V" was changed to "2.0 V". The positive electrode active material thus obtained was subjected to various measurements, and the results shown in Table 1 were obtained.

Example 12

Example Conducting Secondary Compacting (Active Material Precursor: Solid Solution-Based)

A solid solution-based secondary particle powder was prepared in the same manner as in Examples 4 to 7, except that the preparation conditions of raw material particles were altered as follows and the conditions shown in Table 1 were adopted. That is, an aqueous sulfate mixed solution of Ni, Co and Mn was synthesized so as to provide a Co:Ni:Mn molar ratio of 16.3:16.3:67.5 in the mixture, and the synthesized aqueous sulfate mixed solution was allowed to react with NaOH in a hot bath at 50° C. to obtain a coprecipitated hydroxide. The resulting coprecipitated hydroxide was ground and mixed for 16 hours with a ball mill to obtain a powder of raw material particles. Moreover, bismuth oxide (manufactured by TAIYO KOKO CO., LTD.) was added to the powder of raw material particles so as to be 0.5% by weight based on the total weight after addition. In the evaluation of output performance, "4.3 V" as used in the above charge/discharge operation was changed to "4.8 V", and also "2.5 V" was changed to "2.0 V". The positive electrode active material thus obtained was subjected to various measurements, and the results shown in Table 1 were obtained.

TABLE 1

| | | Primary compacting | | Secondary compacting | Properties of cathode active material | | | | |
|---|---|---|---|---|---|---|---|---|---|
| | Base material of active material precursor | Amount of pore-forming agent | Particle diameter of primary compact powder (μm) | Mixing ratio of (primary compact powder):(raw material powder) (mass ratio) | Diameter of primary particles (μm) | Primary particle diameter/ average pore diameter | Aspect ratio of primary particles | Diameter of domain-oriented agglomerate particles (μm) | Orientation ratio of (003) planes (%) |
| Example 1 (Comparative) | Ni-based | 1 | 30 | No secondary compacting* | 0.5 | 1.0 | 1.4 | 15 | 0 |
| Example 2 (Comparative) | Ni-based | 3 | 40 | No secondary compacting* | 1.2 | 0.8 | 1.4 | 15 | 90 |
| Example 3 (Comparative) | Ni-based | 5 | 80 | No secondary compacting* | 0.7 | 1.4 | 1.2 | 20 | 90 |
| Example 4 | Ni-based | — | 3 | 70:30 | 0.3 | 1.7 | 1.4 | 15 | 10 |
| Example 5 | Ni-based | — | 7 | 50:50 | 1.0 | 0.5 | 1.3 | 20 | 10 |
| Example 6 | Ni-based | — | 7 | 80:20 | 0.7 | 2.9 | 1.3 | 15 | 5 |
| Example 7 | Ni-based | — | 10 | 90:10 | 0.6 | 5.0 | 1.2 | 25 | 5 |
| Example 8 (Comparative) | Ternary | 1 | 50 | No secondary compacting* | 0.8 | 1.4 | 1.3 | 20 | 0 |
| Example 9 (Comparative) | Ternary | 3 | 50 | No secondary compacting* | 0.8 | 1.5 | 1.2 | 20 | 90 |
| Example 10 | Ternary | — | 6 | 70:30 | 0.7 | 1.1 | 1.4 | 20 | 10 |
| Example 11 (Comparative) | Solid solution-based | 2 | 30 | No secondary compacting* | 0.5 | 1.0 | 1.2 | 15 | 0 |
| Example 12 | Solid solution-based | — | 10 | 80:20 | 0.3 | 1.3 | 1.2 | 15 | 5 |

| | Properties of positive electrode active material | | | | | Battery performance | |
|---|---|---|---|---|---|---|---|
| | Orientation state | Diameter of individually oriented secondary particles (μm) | Average pore diameter (μm) | Voidage (%) | Open pore ratio (%) | Initial output performance | Output performance retention rate after 100 cycles (%) |
| Example 1 (Comparative) | Non-oriented | — | 0.5 | 1 | 10 | 0.40 | 85 |
| Example 2 (Comparative) | Uniaxially oriented | — | 1 | 5 | 50 | 0.32 | 83 |
| Example 3 (Comparative) | Uniaxially oriented | — | 1 | 8 | 70 | 0.26 | 86 |
| Example 4 | Domain uniaxially oriented | 1 | 0.5 | 3 | 70 | 0.25 | 93 |
| Example 5 | Domain uniaxially oriented | 5 | 0.5 | 5 | 85 | 0.22 | 94 |
| Example 6 | Domain uniaxially oriented | 4 | 2 | 10 | 90 | 0.23 | 92 |
| Example 7 | Domain uniaxially oriented | 8 | 3 | 25 | 90 | 0.22 | 93 |
| Example 8 (Comparative) | Non-oriented | — | 1.1 | 2 | 10 | 0.13 | 86 |
| Example 9 (Comparative) | Uniaxially oriented | — | 1.2 | 5 | 50 | 0.09 | 87 |
| Example 10 | Domain uniaxially oriented | 4 | 0.8 | 10 | 80 | 0.09 | 93 |
| Example 11 (Comparative) | Non-oriented | — | 0.5 | 5 | 50 | 0.95 | 60 |
| Example 12 | Domain uniaxially oriented | 5 | 0.4 | 5 | 90 | 0.65 | 70 |

*Secondary compacting was not conducted and, accordingly, mixing operation of primary compact powder and raw material powder was not conducted.

Examples of Modifications

The above embodiments and specific examples each merely illustrate an example of embodying the present invention which is tentatively considered to be the best mode by the applicant at the time of filing the present application, and should not be construed as limiting the present invention. Therefore, needless to say, various modifications may be suitably made to the above embodiments and specific examples, as far as the essential part of the present invention is not altered.

Another compound may exist in the voids. For example, when an electrolyte, an electrically conductive material, another lithium ion positive electrode active material having excellent rate performance, a positive electrode active material having a different particle diameter, or the like exists in the voids, the rate performance or the cycle performance is further improved. An example of a method of allowing another compound to exist in the voids is a technique in which such a compound is mixed with raw material particles when forming a primary compact or positive electrode active material particles.

Furthermore, the surface of single-crystal primary particles or positive electrode active material particles may be coated with another material. The thermostability or chemical stability of a material may be improved, or the rate performance may be improved, depending on the coating material. Examples of the coating material include chemically stable alumina, zirconia, and alumina fluoride; materials such as lithium cobaltate having excellent lithium diffusibility; carbon having excellent electron conductivity; and polymers which enhances permeability of an electrolytic solution into positive electrode active material particles (for example, PVDF (polyvinylidene fluoride)).

The configuration of a lithium secondary battery to which the positive electrode active material according to the present invention is applied is not limited to the specific battery configurations disclosed in the above Examples. For example, the positive electrode active material according to the present invention can also be preferably applied to a cylindrical lithium secondary battery wound around a winding core. Batteries to which the positive electrode active material according to the present invention can be applied are not limited to those having a so-called liquid type battery configuration and, for example, configurations in which a gel polymer electrolyte or a polymer electrolyte is used as an electrolyte can be employed.

Moreover, the components that constitute the means for solving problems of the present invention and are described in terms of action/function include, in addition to specific structures disclosed in the above embodiments and modifications, any structure capable of achieving said action or function. Furthermore, the contents (including descriptions and drawings) of the prior applications or various publications cited herein can be suitably incorporated herein by reference.

What is claimed is:

1. A positive electrode active material for lithium secondary batteries, comprising domain-oriented agglomerated particles,
   wherein each of the domain-oriented agglomerated particles comprises a plurality of individually oriented secondary particles such that adjacent secondary particles thereof have mutually different orientation directions, wherein the domain-oriented agglomerated particles have an average pore diameter of 0.1 to 5 μm and have an average particle diameter of 1 to 100 μm, and
   wherein each of the individually oriented secondary particles is composed of a plurality of primary particles which are composed of a lithium complex oxide with a layered rock-salt structure and are oriented such that the (003) planes of the primary particles do not intersect each other at least in one axial direction.

2. The positive electrode active material according to claim 1, wherein in each of the individually oriented secondary particles, the plurality of primary particles are oriented such that the (003) planes thereof are approximately parallel to each other.

3. The positive electrode active material according to claim 1, wherein the domain-oriented agglomerated particles have an open pore structure.

4. The positive electrode active material according to claim 1, wherein the domain-oriented agglomerated particles have an open pore ratio of 50% or greater and a voidage of 1 to 30%.

5. The positive electrode active material according to claim 1, wherein the domain-oriented agglomerated particles as a whole have an orientation ratio of (003) planes of 20% or less.

6. The positive electrode active material according to claim 1, wherein the individually oriented secondary particles have an average particle diameter of 0.1 to 20 μm.

7. The positive electrode active material according to claim 1, wherein the primary particles have an average particle diameter of 0.1 to 5 μm.

8. The positive electrode active material according to claim 7, wherein a value obtained by dividing the average particle diameter of the primary particles by the average pore diameter is 0.1 to 5.

9. The positive electrode active material according to claim 1, wherein the primary particles have an average aspect ratio of 1.0 or more and less than 2.0.

* * * * *